July 20, 1943.  G. B. ODATTO ET AL  2,325,013
MECHANICAL MOVEMENT
Filed May 3, 1941  3 Sheets-Sheet 1
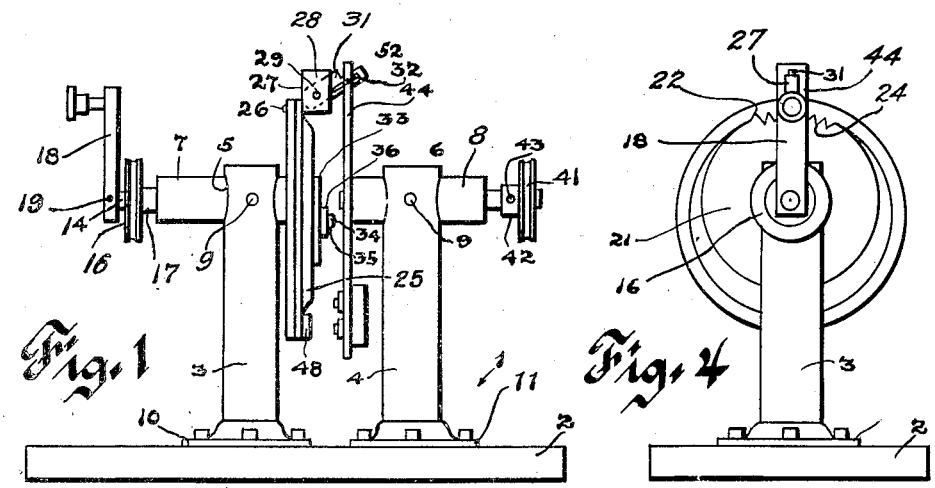
Fig. 1
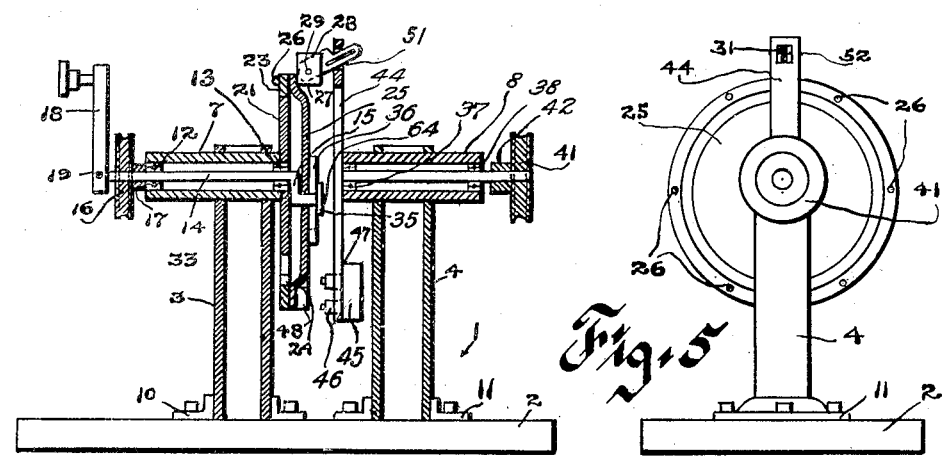
Fig. 2
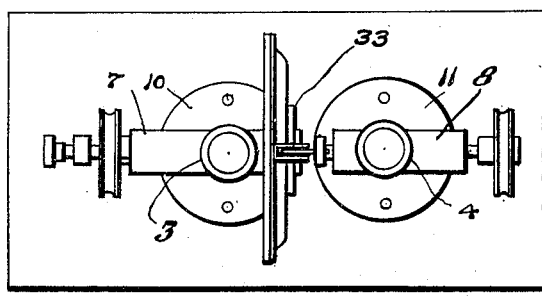
Fig. 3
Fig. 4
Fig. 5
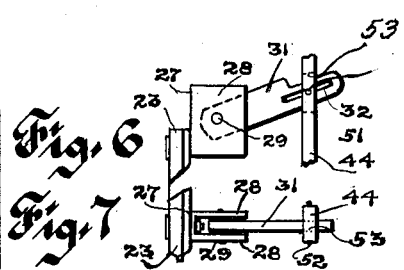
Fig. 6
Fig. 7
George Bert Odatto
and
William J. Wesseler,
INVENTORS.
BY Saywell & Wesseler,
ATTORNEYS.

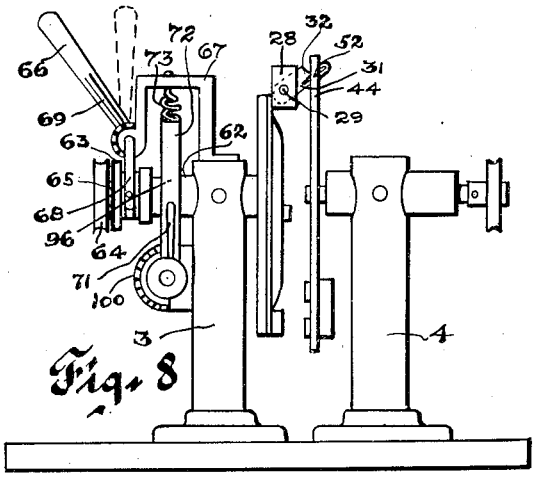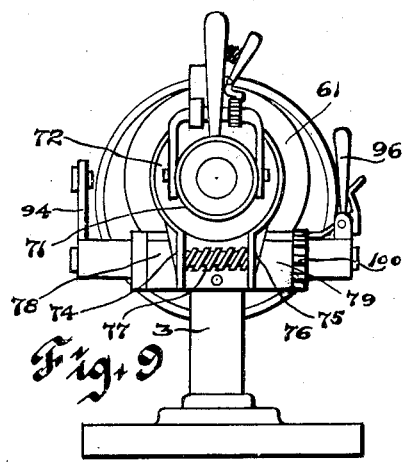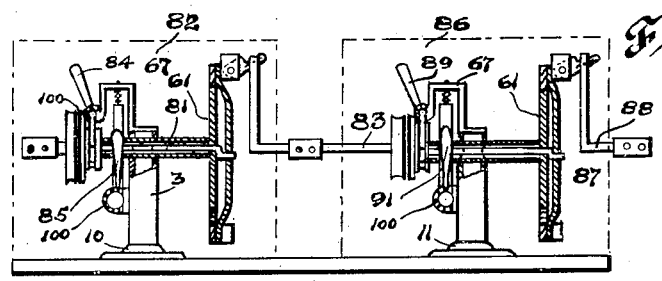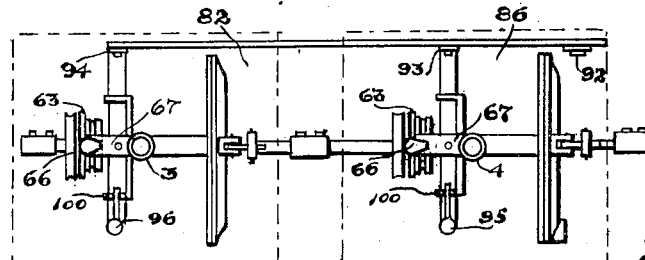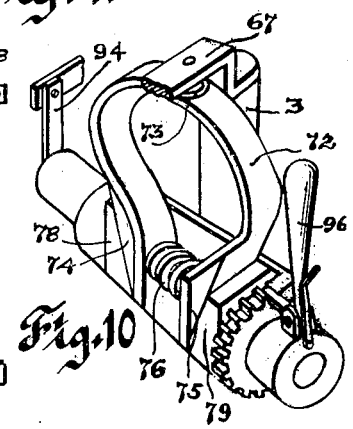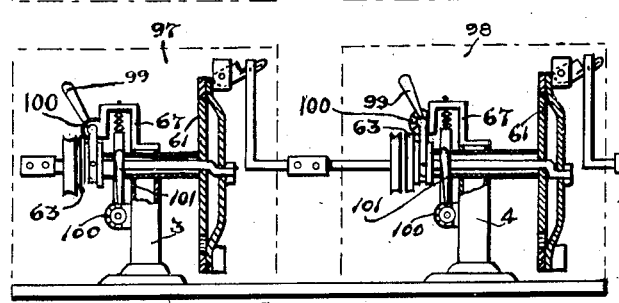

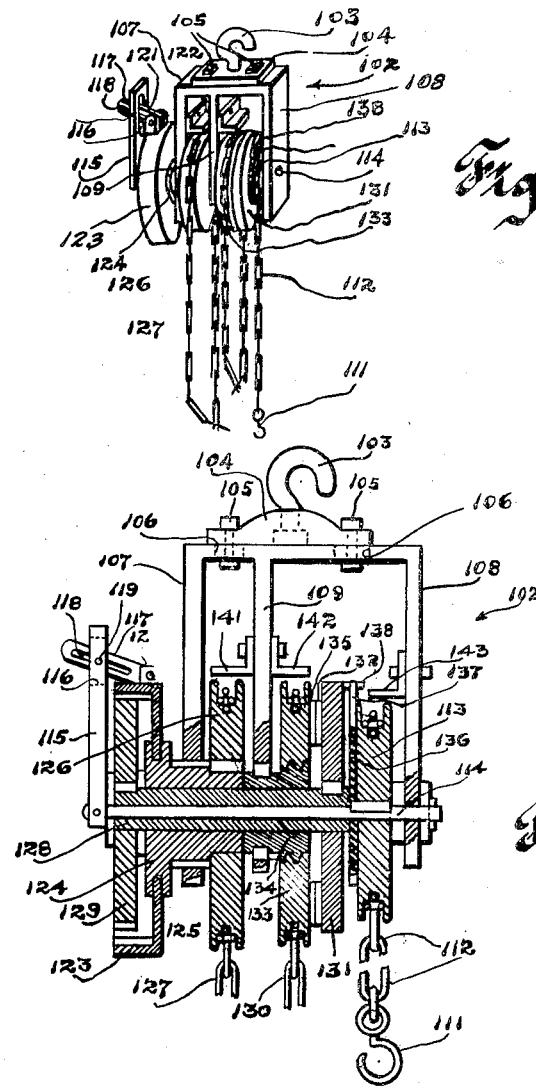

Patented July 20, 1943

2,325,013

UNITED STATES PATENT OFFICE 2,325,013

MECHANICAL MOVEMENT

George Bert Odatto, Cleveland, and William J. Wesseler, East Cleveland, Ohio, assignors to themselves, as joint trustees Application May 3, 1941, Serial No. 391,740

7 Claims. (Cl. 74—308)

This invention, as indicated, relates to a mechanical movement. More particularly it comprises an apparatus adapted to transmit motion at predetermined speed ratios in a more effective manner than has heretofore been possible. Certain portions of the apparatus in general character are similar to those shown in Odatto Patent No. 1,920,877, granted August 1, 1933.

The invention includes a supporting member having aligned shafts for transmitting power and having interposed therebetween a change-speed gear mechanism comprising an internal gear in constant engagement with a spur gear and of sufficiently larger size to be adapted for orbital movement about said spur gear producing epicyclical movement at a point spaced from the center thereof. The invention includes the transmission of movement by means of the mechanism mounted to produce a variety of effects. Where a small gear is employed under a relatively larger internal gear an intermittent movement is produced where a period of substantially no movement takes place in the plane of the contact points of the respective gears adapting the same for operating motion picture cameras and projection machines, and for certain types of machine operations, such as printing presses, punch presses and the like, as well as many other forms of articles and machines too numerous to mention. Where a higher gear ratio is employed the period of intermittent motion may be reduced so that at high speed operation it will cause little irregularity along the power transmission line, and at the same time will produce a high degree of speed reduction within a very compact space. By reason of the large number of teeth in constant engagement in the mechanism the apparatus will operate with a minimum of noise and with a high degree of efficiency with extremely low rate of wear on the parts. The invention also includes means for holding and releasing the spur gear for free rotation whereby the mechanism may be changed from indirect drive to direct, as desired.

In one form of construction the apparatus is particularly adapted for use as a hoist, and is provided with braking means to safely control the loads, particularly during lowering operations. The invention also includes a series of transmission units of the character above mentioned wherein each unit may be driven in direct uniform speed with the driving shaft of the preceding unit, or may be driven indirectly through the gear ratio, and thus transmit variations of power through the series of units.

The invention also includes control of the series of units individually or collectively so as to produce the desired amount of speed or power at the point of delivery. Through the use of a series of transmission units having one or more units running at substantially uniform movement and one or more units running at intermittent speed of varying degree it is possible to change the transmitted movement from uniform to interrupted movement of the desired character.

As stated the apparatus is adapted for use either as a step-up or step-down transmission unit, or may operate in direct connection at the same ratio, or may operate selectively to produce substantially uniform or intermittent motion. The apparatus will serve as a most effective drive for an electric generator, and may be also employed as a compact type of hoist. It is also of widespread utility in connection with speed reduction from high speed turbine power units or from high speed electric motor power units. It is adapted for driving the various types of vehicles, including automobiles, trucks, military units, such as tanks and the like, as well as all the various types of vessels, and in large units may be used in marine transmission lines. It is also adapted for use with the propellers of aircraft, and a variety of speeds can be obtained through the use of a plurality of units of different gear ratios which may be converted for direct drive when desired.

It is to be understood in connection with this application that where reference is made to gear members, such as an internal gear member, or spur gear member, it is contemplated that for certain purposes no gear teeth are required on either member. In one form of construction use may be made of a guiding unit as well as a driving unit for the internal gear transmission member to insure steadiness of operation, particularly under specialized operative conditions. Likewise, two drive elements may be utilized insuring satisfactory operation in the event one of such units fails.

The principal object of the present invention is to provide a power transmission unit in the form of an internal gear having orbital movement in contact with a spur gear and having epicyclical movement with reference to a point of such internal gear unit spaced from the center thereof and providing a transmission point for said unit.

Another object of the present invention is to provide a unit of the type mentioned adapted for direct drive or for change-speed operation.

Another object of the invention is to provide a mechanism movement of the eccentrically moving internal gear type permitting variations in the uniformity of motion of one element of such transmission unit with reference to the other over a wide range of variation from substantially uniform speed to a high degree of intermittent operation.

Another object of the invention is to provide various types of driving mechanism for the apparatus to permit high gear ratios through the use of small teeth or friction type elements.

Another object of the invention is to provide a series of transmission units in constant mesh engagement with each other and having clutch or braking means to bring about speed and power variations.

Another object of the invention is to provide transmission units having a spur gear member and an internal gear member adapted to be driven around said spur gear at a predetermined rate of movement relative thereto in an orbital path for transmitting or receiving movement from one transmission shaft concentrically related to said internal gear and receiving or transmitting movement from said internal gear at a point removed from its center.

Other and further objects of the invention will appear in the course of the following description.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but several of various forms in which the principle of the invention may be used.

In said annexed drawings:

Fig. 1 is a side elevation of an apparatus embodying the principles of the invention;

Fig. 2 is a central vertical sectional view of the structure shown in Figure 1;

Fig. 3 is a top plan view of the structures shown in Figures 1 and 2;

Fig. 4 is an end view of the apparatus shown in Figure 1 as seen from the left-hand side;

Fig. 5 is an end view of the apparatus shown in Figure 1 as seen from the right-hand side;

Fig. 6 is a fragmentary side elevation of the connecting link;

Fig. 7 is a fragmentary view of the structure shown in Figure 6 as seen from above;

Fig. 8 is a central vertical sectional view of a modified form of structure embodying the principles of the invention;

Fig. 9 is an enlarged detailed view showing the brake or clutch element of the device;

Fig. 10 is a fragmentary perspective view of the structure shown in Figure 9;

Fig. 11 is a central vertical sectional view of a multiple unit transmission line;

Fig. 12 is a top plan view of the structure shown in Figure 11;

Fig. 13 is a central vertical sectional view of a modified form of transmission line having a plurality of units;

Fig. 14 is a perspective view of a hoisting mechanism embodying the principles of the invention; and Fig. 15 is a central vertical sectional view of the structure shown in Figure 14.

The invention herein set forth may be embodied in many different forms in accordance with the use to which the apparatus is to be put. It may be mounted on rigid supporting means secured to a stationary base, or the supporting means may be in the form of a casing for the hoisting member or similar unit which may be suspended on a hook or like support at an elevated position.

In the form of construction illustrated in Figures 1 to 5 inclusive supporting means 1 is provided having a base plate 2 and a pair of spaced standards 3, 4, shown as tubular members provided adjacent their upper ends with apertures 5, 6, respectively, to receive in adjustable relation tubular members 7, 8, of smaller diameter than said standards and adapted to be clamped firmly in any desired adjusted position by means of set-screws 9. The standards at their lower ends are preferably secured to the base plate by means of heavy flanges 10, 11, in order to provide a rigid supporting structure.

Within the transverse tubular member 7 adjacent the ends thereof ball bearings 12, 13, are provided, supporting centrally within said tube a shaft 14 having a crank member 15 at the end of said tube spaced from the companion tubular member 8. The opposite end of the shaft 14 is provided with power transmitting means which may be in the form of a pulley 16 secured to such shaft by means of a hub member 17. Any other suitable means of power transmission may be used in place of said pulley, and if desired a hand crank 18 may be secured to said shaft outwardly of said pulley by means of a pin 19 extending through such shaft. Secured to the inner end of a transverse tubular member 7 is a fixed gear or disc-like power transmitting element 21. This member may be provided with teeth 22 of predetermined size and number, or may have a peripheral surface free of gear teeth but having suitable frictional material or surfacing around its peripheral portion. An internal gear transmission member 23 of somewhat larger diameter than the diameter of the transmission member 21 is positioned in constant operative engagement with the member 21 and is adapted to be moved thereabout by means of a crank or an eccentric, or equivalent means whereby a point offset from its center will travel in an epicyclic path. The character of the epicyclic path described by the point just referred to will differ in amplitude in accordance with the relative sizes of the said transmission members 21 and 23. When said transmission members 21 and 23 are formed of diameters closely the same in dimension so as to have approximately the minimum running clearance then the number of separate movements of an offset point on the eccentric gear will be at a maximum and the distance traveled in each movement at a minimum.

This gear ratio will bring about a more uniform rate of transmission than when there are greater differences in diameter between the transmission members 21 and 23. In many instances, however, as has been indicated, when it is desired to secure intermittent action between the gear elements, or transmission members as the case may be, to provide for operating moving picture cameras and projectors, or for driving certain types of printing presses, drill presses, planers, and all the varied field of mechanical and electrical equipment requiring intermittent action, then the gear ratio must be set up in one or more units to increase such intermittent action as desired.

Irrespective of the gear ratio decided on, the apparatus will preferably embody the general principles of the mechanism shown. The eccentric disc 23 has internal gear teeth 24 or a suitable form of frictional driving surface and is in constant engagement with the peripheral portion of the transmission member 21. The transmission member 23 may be in the form of a ring carrying the internal gear teeth and secured to a cup-shaped supporting plate 25 by means of marginal bolts 26 at spaced intervals. At least one of the bolts 26 is used to hold to the periphery of the transmitting member 23 an extension member 27 having side walls 28 supporting a pivot 29 for a transmission link 31 which may be provided with a slot 32 for connection with other elements of the transmission mechanism as will be hereinafter described.

The cup-shaped supporting plate 25 is centrally apertured and preferably has secured thereto a heavy disc 33 providing a bearing for the pin 34 on the crank member 15. A nut 35 is screw-threadedly engaged on the end of the crank pin 34 and beneath said nut a suitable bearing washer 36 is provided to hold the internal transmitting member in firm operative relation to the transmitting member 21.

The tubular member 8 heretofore mentioned is in alignment with the tubular member 7 and is provided adjacent its ends with ball bearings 37, 38, providing a support for a shaft 39. The shaft 39 at its outer end may be provided with a pulley 41 secured to the shaft by means of a hub 42 and pin 43 or any other suitable power transmitting means. At the end of the shaft 39 adjacent the internal eccentric member 23 heretofore described a crank member 44 is provided.

A suitable counterbalance 45 is provided on one end of the crank member 44 being adjustably held thereon by means of stud-bolts 46 slidingly engaged through slots 47 in the crank member. A similar counterbalance 48 may be provided opposite the extension member 27. The opposite end of the crank member 44 is provided with an elongated slot 51 through which a pivot pin 52 may be engaged, said pivot pin being provided with a roller 53 rotatably engaged within the slot 32 of the transmission link 31.

If desired, one or more guide rollers 54 may be provided about the periphery of the internal gear, as shown in Figure 8. Such guide roller may be used as a drive for the internal gear, alone or in combination with the crank arm.

In the modified form of construction shown in Figures 8 and 9, the general construction of the apparatus is similar to that heretofore described and like characters have been applied thereto. The spur gear member, or frictional disc element 61 is carried on a sleeve 62 freely rotatable within the standard 3 when not held against rotation. Thus, when free the apparatus will operate as a direct drive mechanism under certain conditions of operation. It may be provided with a clutch member 63 at the end of the sleeve 62, said clutch member being splined on the sleeve so as to be slidable thereon, and having a friction surface 64 bearing against a friction surface 65 on the pulley when shifted to clutching position by means of a shift lever 66 supported on a standard 67 and having a fork 68 engaging a groove around the periphery of the clutch member. A conventional latching mechanism 69 may be provided for the lever.

The sleeve 62 carries a heavy disc or brake member 71 adjacent the outer side of the standard 3, said friction member being adapted to be engaged by a friction band 72 resiliently supported by a spring member 73 centrally of its upper end, having its end portions 74, 75, spaced by a spring 76 engaged on an operating bar 77. A pair of beveled clamping nuts 78, 79, are engaged upon the bar and bear against beveled inclined surfaces on the ends of the brake band 72. The brake can then be applied from either side by levers 84 or 96 since either end will have sufficient take-up on the beveled surface to securely hold the brake member 71 and its associated mechanism from movement. The provision of two brake members likewise permits individual and simultaneous operation of a series of transmission units arranged for various purposes, as will be hereinafter described. Conventional latching mechanism 100 may be provided for the levers.

Where a variety of changes in speed or changes in the character of the motion from substantially intermittent or interrupted motion to substantially uniform rotary movement is desired a plurality of units may be placed in the transmission line and thrown into and out of action as desired by means of a clutching mechanism, above described.

As is shown in Figure 11 two units substantially identical with the unit shown in Figure 8 are positioned in alignment. Any desired number of units could be coupled in the same manner. It will be noted that the shaft 81 of the unit 82 may drive the shaft 83 directly through the clutch mechanism 84 or in the predetermined gear ratio through the engagement of the brake member 85. The shaft 83 is extended into the unit 86 and is provided with a crank member 87 driving the shaft member 88 through the transmission elements heretofore described. Through the use of the clutch handle 89 or the brake 91, the transmission through said unit may be direct or a step-down or step-up transmission through the unit 86, it being understood that the unit 86 would have to be reversed to provide a predetermined step-down ratio.

The units may be simultaneously controlled, if desired, through the use of a control lever 92 connected with the brake levers 93, 94, or may be individually operated through the brake levers 95, 96. A similar arrangement of levers may be utilized to operate the clutch handles 84, 89.

The construction illustrated in Figure 13 comprises a unit 97 adapted to deliver substantially uniform rotary motion through the transmission line and also have a unit 98 in alignment therewith adapted to provide a degree of intermittent motion through the transmission line. Through the use of the clutch members 99 and the brake members 101 either unit may be thrown out of action as a change-speed unit and caused to drive directly. Thus, full direct drive may be had from said unit and likewise substantially uniform operation may be had through the use of the unit 97, or interrupted motion may be had through the use of the unit 98. A compromise between the two motions may likewise be had by having both units operate in speed-changing ratio.

In addition to the other uses indicated, the principle of the invention is readily applicable to an efficient type of hoist having few parts and being inexpensive to manufacture and maintain under heavy duty service. As is shown in Figures 14 and 15 the hoist comprises a frame or body member 102 having substantially central suspension means in the form of a swiveling hook 103 carried on a plate 104 adjustable to various positions by means of bolts 105 engaged through slots 106 in the frame. The frame has end members 107, 108, and also has an intermediate member 109. The load is carried on a hook 111 on a chain 112 running over a sprocket 113 between the members 108, 109, on the main hoist shaft 114. At the end of the hoist shaft 114 opposite the load sprocket 113 a crank arm 115 is provided, said crank arm having a slot 116 adjacent its upper end through which the driving link 117 having a slot 118 engages over a roller unit 119 supported on the upper end of the crank arm 115 centrally of the slot. The transmission link is pivotally mounted between apertured lugs 121 through which a pivot pin 122 extends, such pivot pin passing through an opening in the end of the transmission link, or driving link 117. The apertured lugs are securely mounted on the peripheral portion of an internal gear member 123 mounted on an eccentric 124 carried on a sleeve 125 extending through the end member 107 and carrying on its opposite end a sprocket wheel 126 keyed thereto, over which is engaged an operating chain 127.

The sleeve 125 is engaged over a sleeve of smaller diameter 128 running on the main hoist shaft 114 which sleeve carries at one end a spur gear 129, and at its opposite end a disc 131 carrying friction material 132 on one side. A clutch, or brake sprocket member, 133 is mounted adjacent the disc 131, and has a screw-threaded hub member engaging with a screw-bearing 134 secured to the intermediate frame member 109 and carries friction material 135 adjacent the disc 131. A chain 150 on the sprocket causes the member 133 to move toward the member 131 and engages the respective friction surfaces for holding or braking action on the spur gear 129. The sprocket 113 has on one side a ratchet flange 136 which is engaged by a pawl 137 carried on a pin 138 secured to the adjacent face of the friction disc member 131. Retaining guide members 141, 142, 143 may be secured to the adjacent frame members 109, 108, respectively, above the sprocket wheels 126, 133, 131.

The hoist operation is accomplished by operating the chain 127 which drives the internal gear through the eccentric 124 at a low ratio around the spur gear 129 and through the driving link 117 and crank arm 115 turns the hoist shaft 114 carrying the sprocket 113 upon which the chain 112 is mounted. The ratchet 136 and pawl 137 prevents the load descending while the clutch member 133 is engaged with the disc 131, but on releasing the clutch 133 through the chain 130, the load may be lowered at any desired speed, the mechanism operating in direct drive on release under frictional control.

Other modes of applying the principle of our invention may be employed instead of those explained, change being made as regards the mechanism herein disclosed, provided the means stated by any of the following claims or the equivalent of such stated means be employed.

We therefore particularly point out and distinctly claim as our invention:

1. A mechanical movement comprising a support, a pair of coaxial shafts mounted for rotation on said support, crank elements mounted on said shafts in adjacent positions to each other, a gear element mounted for rotation on one crank element eccentrically to said shaft, a companion gear element rotatably mounted on said support, means for selectively holding said companion gear element against rotation, said first-named gear element having engagement with said companion gear element and having orbital movement in relation thereto when said companion gear element is held against rotation, one of said gear elements having internal gear teeth, and a driving connection from a point offset from the center of said gear element having orbital movement to the crank element mounted on the other of said shafts whereby epicyclic motion of said point is transformed into motion imparted to said last named shaft.

2. A mechanical movement comprising a support, a pair of gear members at least one of which is held without movement on said support, said gear members including an internal gear member and a spur gear member in engagement therewith, operative means on one of said gear members substantially in the plane of the peripheral margin thereof and said operative means having an epicyclic path of movement with reference to the companion gear member of said pair of gear members, and eccentric means rotatably supporting one of said gears for producing relative rotational movement between said gear members, and causing said epicyclic movement of said operative means.

3. A mechanical movement comprising supporting means, aligned shafts mounted thereon, a crank element mounted on each shaft at the adjacent ends thereof, a spur gear rotatably mounted on said support, friction means for holding said spur gear against rotation, an internal gear member engaged with said spur gear for orbital motion thereabout, means rotatably connecting the center of said internal gear member with one of said crank elements, means for connecting, for epicyclic motion, a point offset from the center of said internal gear with the other of said crank elements, and means for transmitting motion through said respective shafts.

4. A mechanical movement comprising supporting means, aligned shafts mounted thereon, a crank element mounted on each shaft at the adjacent ends thereof, a spur gear rotatably mounted on said support, friction means for retarding the releasing motion of said spur gear in either direction, an internal gear member engaged with said spur gear for orbital motion thereabout, means rotatably connecting the center of said internal gear member with one of said crank elements, means for connecting, for epicyclic motion, a point offset from the center of said internal gear with the other of said crank elements, and means for transmitting motion through said respective shafts.

5. An apparatus of the character described having in combination supporting means, a spur gear rotatably mounted on said supporting means, controlling means to selectively hold said spur gear in non-rotatable relation to said support, means for operating said controlling means, an internal gear movably supported to have running contact with said spur gear, means to move said internal gear eccentrically around said spur gear, and means to transmit power from said internal gear.

6. An apparatus of the character described having in combination supporting means, a spur gear rotatably mounted on said supporting means, controlling means to selectively hold and release the rotary movement of said spur gear in relation to said support, means for operating said controlling means, an internal gear movably supported to have running contact with said spur gear, means to move said internal gear eccentrically around said spur gear, and means to transmit power from said internal gear.

7. An apparatus of the character described, having in combination supporting means, a plurality of transmission units in aligned position on said supporting means, a spur gear rotatably mounted in each transmission unit, means for selectively holding each spur gear against rotation for indirect drive and for releasing said selected spur gear for direct drive, an internal gear of larger diameter than its respective spur gear mounted on each of said spur gears in operative engagement with the peripheries of said spur gear, respectively, means for moving each of said internal gears eccentrically around said respective spur gears, power transmission means offset from the center of said internal gears, respectively, a pair of aligned transmission shafts, and means for connecting the first and last transmission units centrally and eccentrically, respectively, to said respective shafts.

GEORGE BERT ODATTO.
WILLIAM J. WESSELER.